United States Patent [19]

Ishikawa et al.

[11] Patent Number: 4,929,977
[45] Date of Patent: May 29, 1990

[54] FLASH PHOTOGRAPHY CHANGEOVER DEVICE

[75] Inventors: Tadashi Ishikawa; Shigeru Tagami; Kazuo Akimoto; Hiroto Tsuyuki; Michio Kawai; Kanji Ito; Takayuki Sato; Takahito Otora; Teruyo Hayakawa, all of Chiba, Japan

[73] Assignee: Seikosha Co., Ltd., Tokyo, Japan

[21] Appl. No.: 377,674

[22] Filed: Jul. 10, 1989

[30] Foreign Application Priority Data

Jul. 11, 1988 [JP] Japan .................. 63-172189
Jul. 11, 1988 [JP] Japan .................. 63-172190

[51] Int. Cl.$^5$ .................. G03B 7/00; G03B 15/03
[52] U.S. Cl. .................. 354/420; 354/421; 354/422; 354/236
[58] Field of Search ............ 354/420, 421, 422, 236

[56] References Cited

U.S. PATENT DOCUMENTS 3,635,142 1/1972 Ataka et al. .................. 354/236 X
4,166,685 9/1979 Hashimoto et al. ............ 354/436 X Primary Examiner—W. B. Perkey
Attorney, Agent, or Firm—Jordan and Hamburg

[57] ABSTRACT

In a camera having a lens shutter and a focal-plane shutter accomplishing the operations of programed exposure and aperture control, a flash photography changeover device includes a first changeover circuit for setting a lens shutter mode for operating the lens shutter as a programed shutter or a focal-plane shutter mode for controlling the shutter speed by the focal-plane shutter and the aperture by the lens shutter; a first driving device for controlling the programed exposure value and/or the aperture value of the lens shutter; a second driving device for controlling the shutter speed of the focal-plane shutter; a sequence control circuit for controlling the operating timings of the two driving devices; a setting circuit for selecting and setting automatic exposures with a natural light and a flash light; and a coercive changeover circuit for setting the lens shutter mode irrespective of the setting of the first changeover circuit when the setting circuit is set to the automatic exposure with the flash light. The setting circuit and the coercive changeover circuit may be replaced by a determining circuit for detecting and determining a limit shutter speed at which the focal-plane shutter is synchronized with the flash light; and a coercive changeover circuit for setting the lens shutter mode irrespective of the setting of the first changeover circuit for setting the shutter mode, when the determining circuit determines that the shutter speed exceeds the limit speed.

10 Claims, 7 Drawing Sheets

FLASH PHOTOGRAPHY CHANGEOVER DEVICE

BACKGROUND OF THE INVENTION

1. Field of the Invention

The present invention relates to a camera having a lens shutter and a focal-plane shutter.

2. Description of the Prior Art

There are well known in the prior art both a camera having a lens shutter (LS) (as will be hereinafter referred to as the "LS camera") and a camera having a focal-plane shutter (FPS) (as will be hereinafter referred to as the "FPS camera").

The LS camera is effective for flash photography because of the formation of a shutter opening, whereas the FPS camera can have its lenses interchanged because of its light-interrupting formation and can control a high shutter speed because of its operation mode.

In order to exploit the features of the cameras of the above-specified two modes, with a set of interchangeable lenses of the FPS camera, there has been proposed an interchangeable lens of the type which is equipped with a solely or independently operating LS.

However, the FPS and the LS are equipped with separate control units which is duplicative and wasteful.

In order to solve the problem specified above, we have already proposed a camera system which is equipped with an LS and an FPS (as disclosed in Japanese Patent Application Nos. 63-172189 and 63-172190.

For flash photography, however, the FPS has its speed limited for synchronization with the flash, and the camera having the FPS and the LS still has various other problems.

SUMMARY OF THE INVENTION

The present invention has been conceived to solve the above-specified problems and has as an object to provide a camera which is equipped with an LS and an FPS and which selects an LS mode automatically for an object to be flash-photographed, thereby preventing any photographic mistake.

This object of the present invention can be achieved by providing, in a camera having a lens shutter and a focal-plane shutter accomplishing the operations of programed exposure and aperture control, a flash-photography changeover device which includes first changeover means for setting a lens shutter mode for operating the lens shutter as a programed shutter and a focal-plane shutter mode for controlling the shutter speed by the focal-plane shutter and the aperture by the lens shutter; first driving means for controlling the programed exposure value and/or the aperture value of the lens shutter; second driving means for controlling the shutter speed of the focal-plane shutter; sequence control means for controlling the operation timings of the two driving means; setting means for selecting and setting automatic exposures with a natural, ambient light and a flash light; and coercive changeover means for setting the lens shutter mode irrespective of the setting of the first changeover means when the setting means is set to the automatic exposure with the flash light.

The above-specified object is achieved by a flash photography changeover device which includes determining means for detecting and determining a limit shutter speed at which the focal-plane shutter is synchronized with the flash light; and coercive changeover means for setting the lens shutter mode irrespective of the setting of the first changeover means for setting the shutter mode, when the determining means determines that the shutter speed exceeds the limit shutter speed.

BRIEF DESCRIPTION OF THE DRAWINGS

Other objects, features and advantages of the present invention will become apparent from the following description taken in conjunction with the accompanying drawings, in which.

DESCRIPTION OF THE PREFERRED EMBODIMENTS

Figure 1:
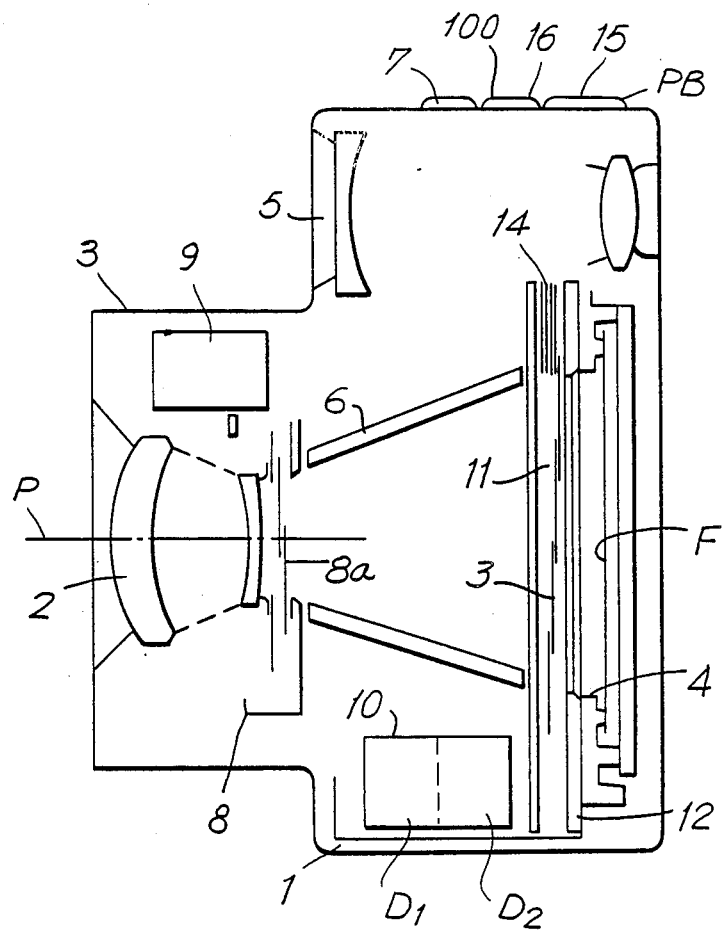
FIG. 1 is a schematic cross-sectional view showing a camera according to one embodiment of the present invention.

One embodiment of the present invention will now be described in detail with reference to the accompanying drawings. In FIG. 1, an object lens 2 is mounted on a camera body 1 such that it is supported by a lens barrel 3. The image of an object passing through lens 2 is focused on a photosensitive material F (which will be hereinafter referred to as the "film") fitted at the back of camera body 1 within a range defined by a photographing area 4.

Camera body 1 is equipped in its upper portion with a view finder 5 having a field of view, and a light-interrupting barrel 6 is provided in camera body 1 for interrupting detrimental light to film F from portions of camera body 1 other than object lens 2. Camera body 1 is also equipped at the upper surface thereof with a shutter release button 7 for operating the camera.

At the back of object lens 2, there is disposed a lens shutter (LS) 8 for opening or closing the lens aperture This lens aperture is usually closed by shutter blades 8a.

A step motor 9 is disposed in lens barrel 3 and responds to the output signal of a first driving means D1 to operate shutter blades 8a for opening or closing the lens aperture.

An electronic circuit 10 for controlling step motor 9 is also provided and is composed of first driving means D1; a sequence control means SC for controlling the respective operation timings of the lens and focal-plane shutters; a light-measuring circuit having a photocell for measuring the object brightness; and a later-described second driving means D2.

A focal-plane shutter (FPS) 11 is constructed such that an opening blade 13 and a closing blade 14 are supported on a base-plate 12 mounted on camera body 1. Blades 13 and 14 of FPS 11 operate with a desired time interval to control the exposure time when two electromagnets (not shown) are sequentially operated by second driving means D2 of electronic circuit 10.

Incidentally, FPS 11 is cocked by a known method when the film is transported, but solely and separately of the film transport in the case of multiple exposure.

A changeover means 15 includes a pushbutton PB disposed on the top of camera body 1 so as to select whether the photography is to be accomplished by FPS 11 or LS 8.

A setting means 16 likewise includes a pushbutton 100 disposed on the top of camera body 1 so as to select and set the automatic exposures using natural or ambient light and the flash light.

Figure 2:
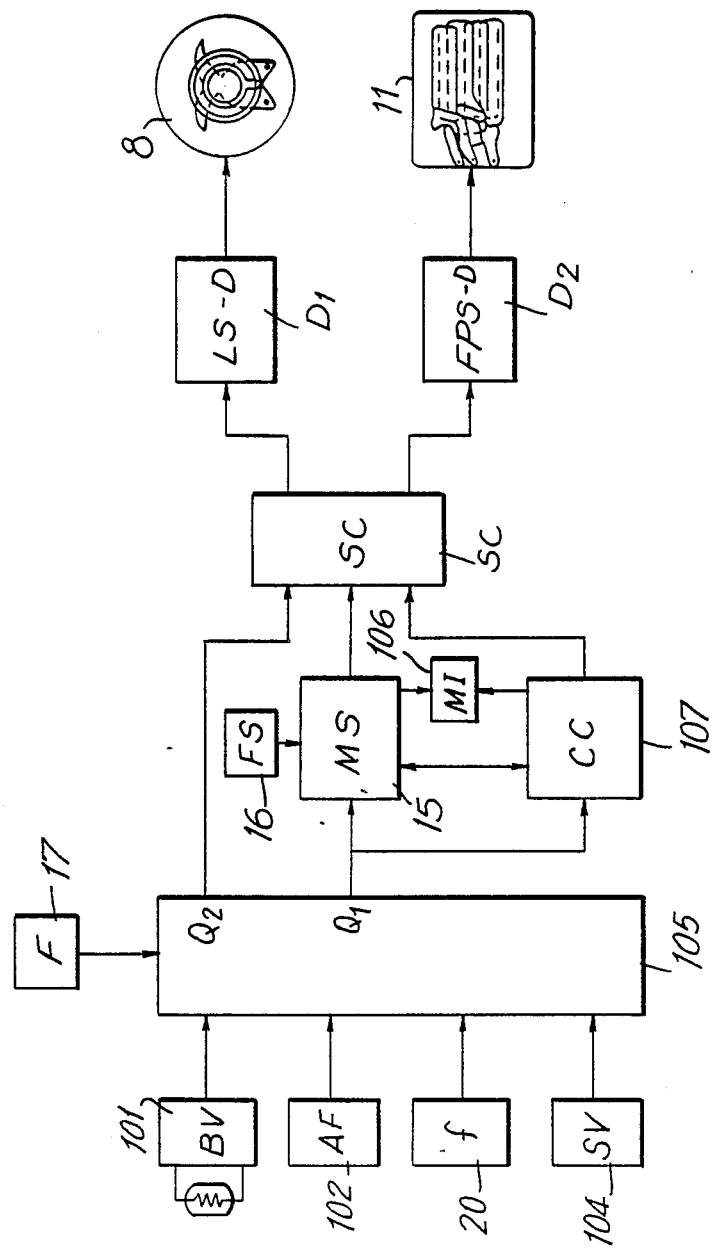
FIG. 2 is a block diagram of the circuitry of the camera of FIG. 1.

FIG. 2 is a block diagram showing the operation system of the structure thus far described.

An operation means 105 receives the signals of a light-measuring circuit 101 having a light-receiving element for measuring the brightness of an object; a distance-measuring circuit 102 for measuring the distance to the object; means 20 for setting the focal distance f of object lens 2; and means 104 for setting the film speed, and in response thereto, supplies output signals to a changeover circuit MS of changeover means 15 and to the later-described sequence control means SC.

Changeover circuit MS selects whether the programed exposure by LS 8 or the exposure time control by FPS 11 is to be accomplished, Specifically, if pushbutton PB of changeover means 15 is depressed once, the operation mode is set to the lens shutter mode for the LS; if pushbutton PB is twice depressed, the operation mode is set to the focal-plane shutter mode for the FPS; and if pushbutton PB is depressed again, the operation mode is set back to the lens shutter mode.

Even if setting means 16 is set in the position for automatic exposure by natural light, the operation mode is coercively set to the lens shutter mode by coercive changeover means 107 when the output Q1 of operation means 105 indicates that the object is incapable of automatic exposure by natural light.

On the other hand, the output Q2 of operation means 105 feeds signals dictating the individual modes to sequence control means SC so as to set the exposure level according to the brightness of the object.

A mode-indicating means 106 indicates the aforementioned set mode and repeats the same by flashing when the mode is coercively set to the lens shutter mode.

In response to the signal from changeover circuit MS of changeover means 15 or from coercive changeover means 107, sequence control means SC operates FPS 11 and LS 8 with a preset timing of operation of first driving means D1 and second driving means D2.

Figure 4:
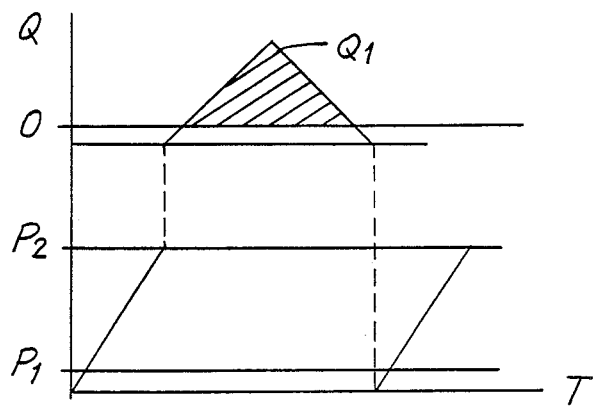
FIGS. 4, 5 and 6 are waveform diagrams showing the operations of the camera of FIG. 1.
Figure 5:
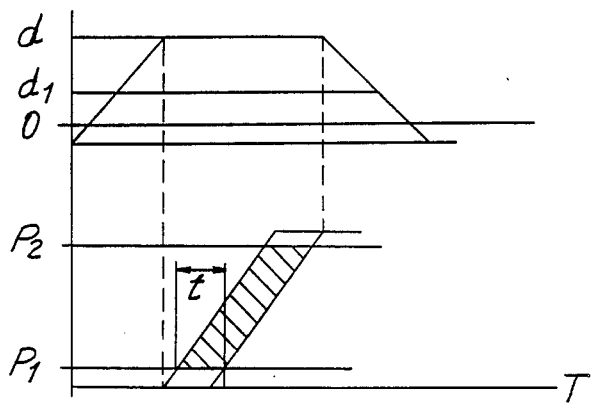

Next, the operations will be described with reference to FIGS. 3-5. In FIGS. 4 and 5, the abscissa indicates elapsed time, and the ordinate indicates the exposure value or frame position on the photographing area.

Figures 3A, 3B:
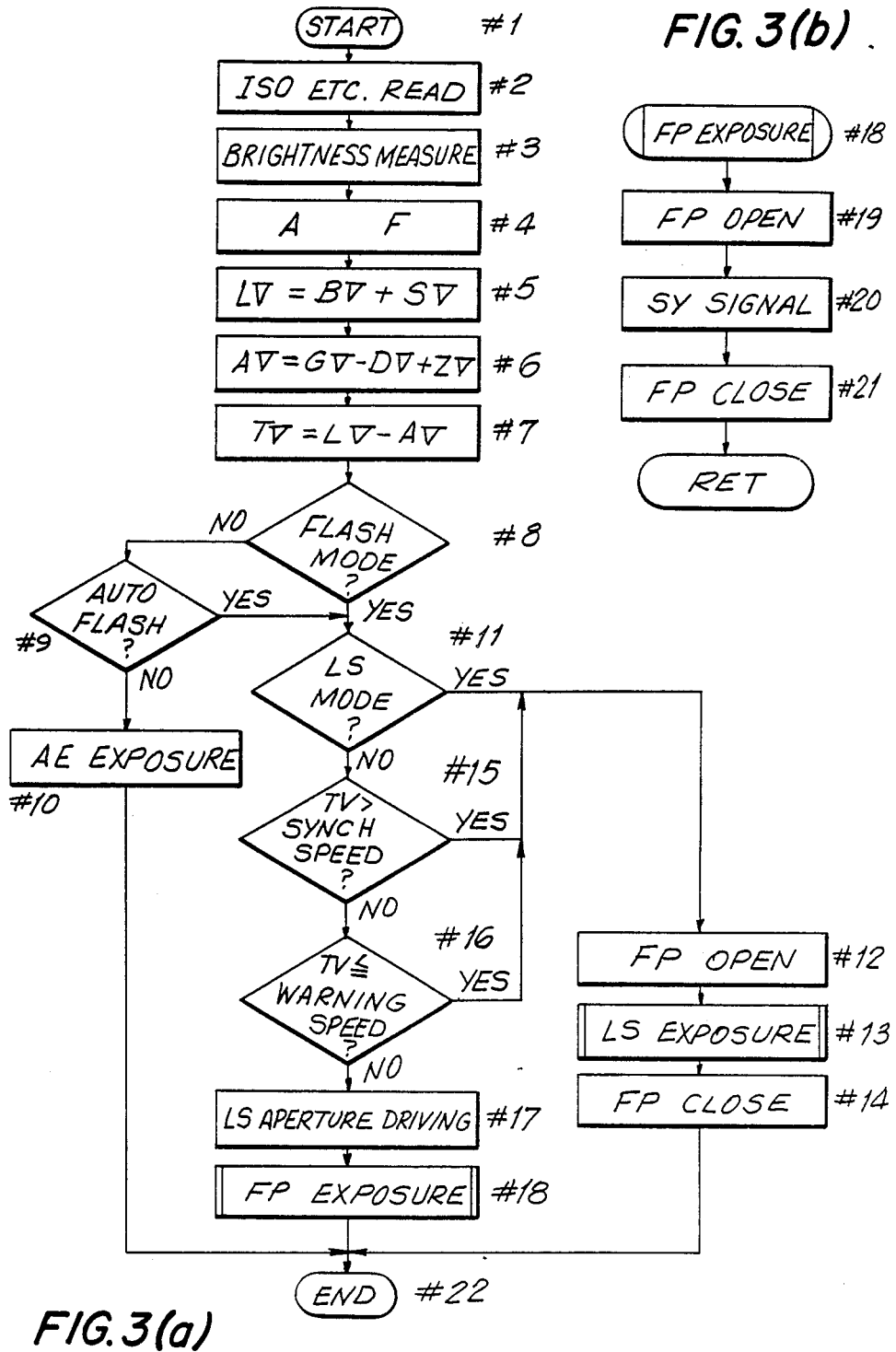
FIGS. 3(a) and 3(b) are flow charts showing the operations of the camera of FIG. 1.

In the operation flow chart of FIG. 3(a), Step #1 indicates that shutter release button 7 of the camera is depressed to energize the camera system as a whole from a power source (not shown).

The operations will be described in accordance with the following steps. The data SV from film speed setting means 104, the data BV from light-measuring circuit 101, and the data DV from distance-measuring circuit 102 are fed to operation means 105 at Steps #2, #3 and #4, respectively, so that the operation indicated in Step #5 is performed. Then, the data GV from a flash means 17, the data ZV from focal distance setting means 20, and the aforementioned data DV are inputted at Step #6 to operation means 105 so that the operation indicated in Step #7 is accomplished.

At Step #8, it is determined whether or not setting means is set in the strobe mode using flash means 17. If NO, i.e., if in the photographic state using natural light, the operation advances to Step #9.

At Step #9, it is determined on the basis of the result of the above operations whether or not flash means 17 should be caused to flash automatically. If NO, the operation is shifted to Step #10 in accordance with the set mode of changeover means 15 so that automatic exposure is accomplished with natural light.

If YES, i.e., if it is determined at Step #9 that automatic exposure is required, the operation is shifted to Step #11, at which it is determined whether or not changeover means 15 is set at the LS mode. If YES, the exposing operations are accomplished sequentially in the order of Steps #12, #13 and #14, as shown in FIGS. 3 and 4. Here, flash means 17 flashes in a known manner in response to a signal of LS 8.

If, on the contrary, it is determined at Step #11 that the FPS mode is set, the operation is shifted to Step #15, at which it is determined whether or not the shutter speed of FPS 11 to be operated is shorter than the time for which the whole frame is to synchronize with the flash of flash means 17. If YES, the operations subsequent to Step #12 are accomplished, and if NO, the operation is shifted to Step #16. At Step #16, it is determined whether or not the camera is operated for photography with the shutter speed of FPS 11. If YES, the operation is returned to Step #12 so that subsequent LS operations are then accomplished. If NO, on the contrary, the operation is shifted to Step #17, in accordance with the sequence shown in FIG. 6, at which LS 8 is caused to set a predetermined aperture diameter d1 by operation means 105. Subsequently, opening blade 13 of FPS 11 is then opened at Step #19, and flash means 17 is caused to flash at Step #20, as shown in FIG. 3(b). At Step #21, moreover, closing blade 14 runs to end the exposure.

If, on the other hand, setting means 16 is set at Step #8 in the strobe mode using flash means 17, the operation advances to Step #11, and determinations are subsequently made in accordance with above-described Steps #11, #15 and #16. In situations using the LS 8, the operation is shifted to Step #12, and when using FPS 11 the operation is shifted to Step #18, at which LS 8 or FPS 11 is operated as described above.

FIG. 4 is an operation diagram for the case where changeover means 15 is set in the lens shutter mode for the exposing operations using LS 8. If shutter release button 7 of FIG. 1 is depressed for photography, sequence control means SC first designates second driving means D2 to output a signal so that opening blade 13 of FPS 11 is moved from one end P1 to the other end P2 of the frame to open photographing area 4.

Next, sequence control means SC designates first driving means D1 to output a signal so that LS 8 is opened or closed to expose film F in the light amount corresponding to the area Q1. At this time, LS 8 accomplishes the programed exposure by varying both the aperture diameter and shutter speed, depending upon the brightness of the object.

Subsequently, sequence control means SC designates second driving means D2 to output a signal so that closing blade 14 of FPS 11 is moved from the one end P1 to the other end P2 to close photographing area 4.

When FPS 11 ends its operation, sequence control means SC outputs a signal for winding up film F to a new frame number and energizes the motor (not shown) for charging FPS 11.

By the operations thus far described, the photography in the lens shutter mode is ended.

FIG. 5 is an operation diagram for the case where changeover means 15 is set in the focal-plane shutter mode for exposure by FPS 11.

If shutter release button 7 of FIG. 1 is depressed for photography, sequence control means SC first designates first driving means D1 to output a signal so that LS 8 is opened to a predetermined aperture value d1 to open the lens aperture.

Next, sequence control means SC designates second driving means D2 to output a signal so that opening blade 13 and closing blade 14 of FPS 11 are sequentially operated to expose film F. At this time, opening and closing blades 13 and 14 operate at a time interval t giving a proper exposure value in combination with the aperture value d1 of LS 8, in dependence upon the brightness of the object.

Subsequently, sequence control means SC designates first driving means D1 to output a signal to thereby close LS 8.

At the end of the operation of LS 8, sequence control means SC outputs a signal to wind up film F to a new frame number and energizes the motor (not shown) to charge FPS 11.

Figure 6:
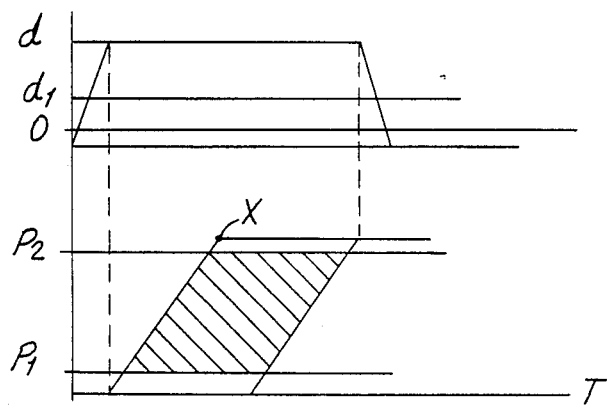

Incidentally, in the operations within the so-called "strobe-synchronized limit speed range of the FPS," in which the exposure time by FPS 11 is relatively long, opening blade 13 is opened, as shown in FIG. 6, to turn on a strobe trigger switch at point X so that flash means 17 is caused to flash with photographing area 4 being opened fully from position P1 to position P2.

By the operations thus far described, the photography in the focal-plane shutter mode is ended.

In the aforementioned embodiment, setting means 16 is enabled to accomplish the automatic exposing operations using flash means 17 by setting a control unit disposed outside of the camera by the user, by mounting flash means 17 on the camera, by bringing flash means 17 built into the camera into its operational state, or by detecting the brightness of the object or the backlighted state automatically.

Thus, if changeover means 15 determines which of the LS or FPS is to be operated, or if the camera is brought into the state requiring operation of flash means 17 by setting means 16, as has been apparent from the foregoing description, the correct photography synchronized with the light can be accomplished, regardless of whether FPS 11 or LS 8 is to operate, such that sequence control means SC can operate the LS and FPS with the correct timings to exploit the features of the two shutters effectively for the photographic object.

Another embodiment of the present invention will now be described in the following with reference to FIG. 7. As shown, an object lens 202 is mounted on a camera body 201 such that it is supported by a lens barrel 203. The image of an object passing through lens 202 is focused on a photosensitive material F (which will be hereinafter referred to as the "film") fitted at the back of camera body 201 within a range defined by a photographing area 204.

Camera body 201 is equipped in its upper portion with a viewfinder 205 having a field of view, and a light-interrupting barrel 206 is provided in camera body 201 for interrupting detrimental light to film F from portions of camera body 1 other than object lens 202. Camera body 201 is also equipped at the upper surface thereof with a shutter release button 207 for operating the camera.

At the back of object lens 202, there is disposed a lens shutter (LS) 208 for opening or closing the lens aperture This lens aperture is usually closed by shutter blades 208a.

A step motor 209 is disposed in lens barrel 203 and responds to the output signal of a first driving means D1 to operate shutter blades 208a for opening or closing the lens aperture.

An electronic circuit 210 for controlling step motor 209 is also provided and is composed of first driving means D1; a sequence control means SC for controlling the respective operation timings of the lens and focal-plane shutters; a light-measuring circuit having a photocell for measuring the object brightness; and a later-described second driving means D2.

A focal-plane shutter (FPS) 211 is constructed such that an opening blade 213 and a closing blade 214 are supported on a base-plate 212 mounted on camera body 201. Blades 213 and 214 of FPS 211 operate with a desired time interval to control the exposure time when two electromagnets (not shown) are sequentially operated by a second driving means D2 of electronic circuit 210.

Incidentally, FPS 211 is cocked by a known method, when the film is transported, but solely and separately of the film transport in the case of multiple exposure.

A changeover means 215 includes a pushbutton PB disposed on the top of camera body 1 so as to select whether the photography is to be accomplished by FPS 211 or LS 208.

Figure 8:
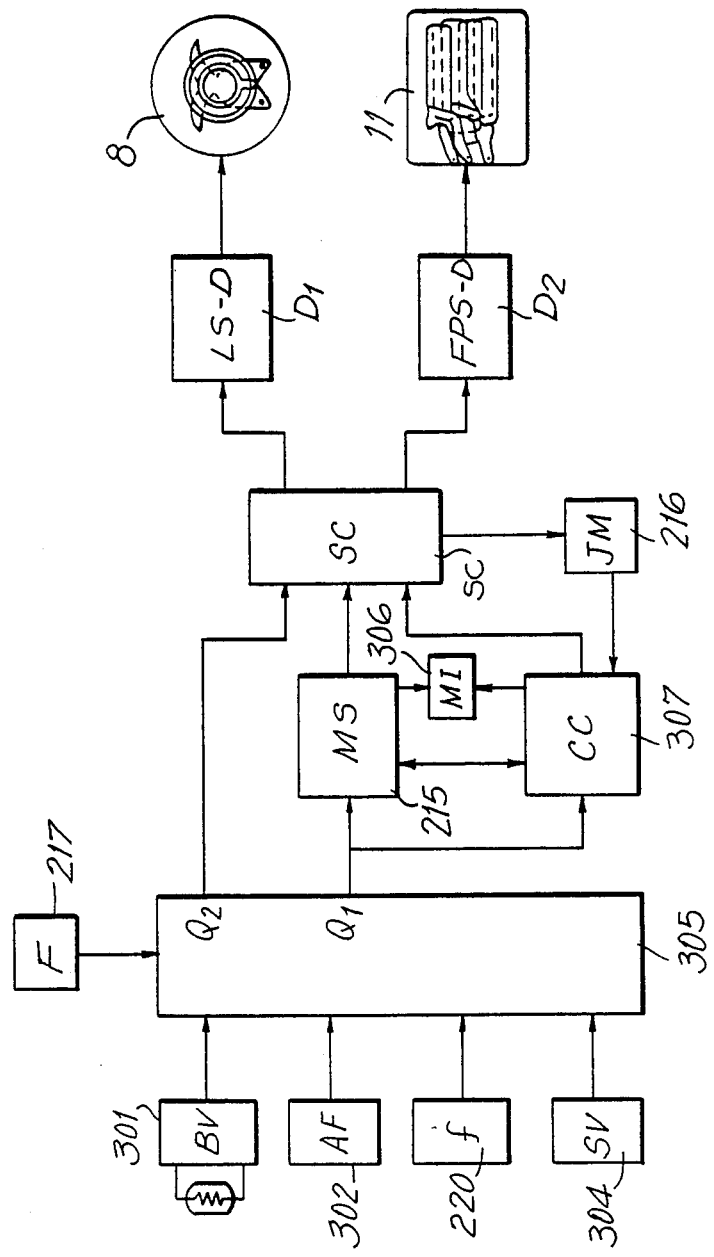
FIG. 8 is a block diagram of the circuitry of the camera of FIG. 7.

FIG. 8 is a block diagram showing the operation system of the structure thus far described.

An operation means 305 receives the signals of a light-measuring circuit 301 having a light-receiving element for measuring the brightness of an object; a distance-measuring circuit 302 for measuring the distance to the object; means 220 for setting the focal distance f of object lens 202; and means 304 for setting the film speed, and in response thereto, supplies output signals to a changeover circuit MS of changeover means 215 and to the later-described sequence control means SC.

Changeover circuit MS selects whether the programed exposure by LS 208 or the exposure time control by FPS 211 is to be accomplished. Specifically, if pushbutton PB of changeover means 215 is depressed once, the operation mode is set to the lens shutter mode for the LS; if pushbutton PB is twice depressed, the operation mode is set to the focal-plane shutter mode for the FPS; and if pushbutton PB is depressed again, the operation mode is set back to the lens shutter mode.

The output Q1 of operation means 305 supplies a signal to changeover circuit MS which, in turn, supplies a signal to a mode-indicating means 306, the latter indicating the mode setting of changeover means 215 and the exposure situation in that mode.

The output Q2 of operation means 305 feeds signals dictating the individual modes to sequence control means SC so as to set the exposure level according to the brightness of the object.

In the case where changeover means 215 is set in the focal-plane shutter mode so that a flash means 217 is to be used, a determining means 216 is coercively caused to set the lens shutter mode by a coercive changeover means 307 if the operating speed of the FPS exceeds the limit value for synchronization with the flash means 217 by output Q2.

Mode-indicating means 306 indicates the aforementioned set mode and repeats the same by flashing when the mode is coercively set to the lens shutter mode.

In response to the signal from changeover circuit MS of changeover means 215 or from coercive changeover means 307, sequence control means SC operates FPS 211 and LS 208 with a preset timing of operation of first driving means D1 and second driving means D2.

Next, the operations will be described with reference to FIGS. 9 and 4–6. In FIGS. 4–6, the abscissa indicates elapsed time, and the ordinate indicates the exposure value or frame position on the photographing area 204.

Figure 9:
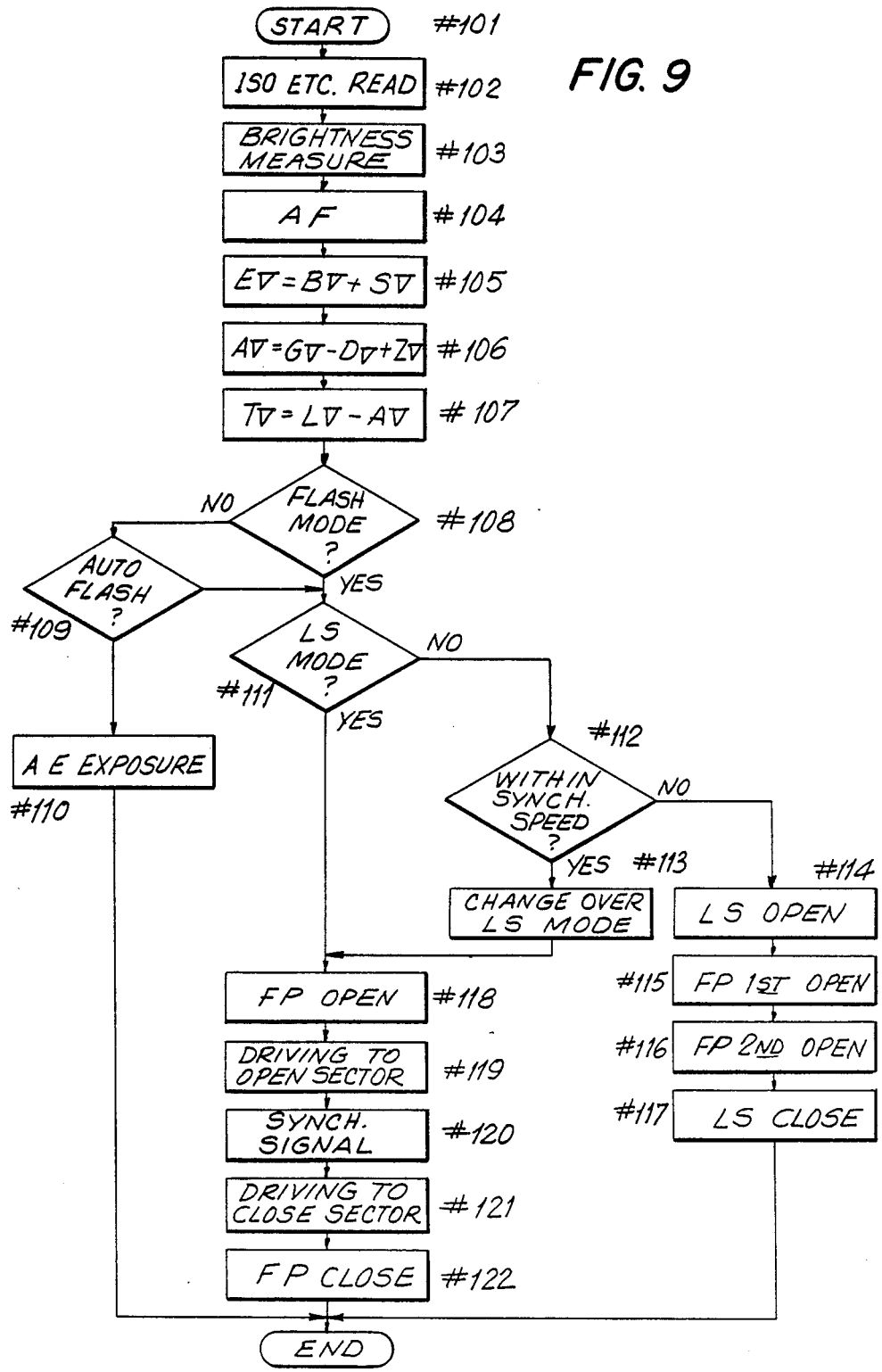
FIG. 9 is a flow chart showing the operations of the camera of FIG. 7.

In the operation flow chart of FIG. 9, Step #101 indicates that shutter release button 207 of the camera is depressed to energize the camera system as a whole from a power source (not shown).

The operations will be described in accordance with the following steps. The data SV from film speed setting means 304, the data BV from light-measuring circuit 301, and the data DV from distance-measuring circuit 302 are fed to operation means 305 at Steps #102, #103 and #104, respectively, so that the operation indicated in Step #105 is performed. Then, the data GV from flash means 217, the data ZV from focal distance setting means 220, and the aforementioned data DV are inputted at Step #106 to operation means 305 so that the operation indicated in Step #107 is performed.

At Step #108, it is determined whether or not operation circuit 305 is in the mode using flash means 217. If NO, i.e., if in the photographic state using natural light, the operation advances to Step #109.

At Step #109, it is determined on the basis of the result of the above operations whether or not flash means 217 should be caused to flash automatically as an auxiliary light. If NO, the operation is shifted to Step #110 in accordance with the set mode of changeover means 215 so that automatic exposure is accomplished with natural light.

If YES, i.e., if it is determined at Step #109 that automatic exposure is required, the operation is shifted to Step #111, at which it is determined whether or not changeover means 215 is set at the LS mode. If YES, the exposing operations are accomplished sequentially in the order of Steps #118, #119, #120 and #121, as shown in FIGS. 4 and 9. Here, flash means 217 flashes in a known manner in response to a signal of LS 208.

If, on the contrary, it is determined at Step #111 that the FPS mode is set, the operation is shifted to Step #112, at which it is determined whether or not the shutter speed to be operated by FPS 211 is shorter than the time period for synchronization with the flash of flash means 217. If YES, the operation is shifted to Step #113, at which the mode is changed to the lens shutter mode by coercive changeover means 307, until the operation is shifted to the Step #118.

If, on the contrary, it is determined at Step #112 that the speed exceeds this time period, the exposing operations of FIG. 6 are accomplished in the order of Steps #114, #115, #116 and #117.

If, on the contrary, it is determined at Step #111 that the LS mode is set, or if the routine is shifted from Step #113 to Step #118, the LS operations shown in FIG. 4 are then accomplished in the order of Steps #119, #120, #121 and #122.

FIG. 4 is an operation diagram for the case where changeover means 215 is set in the lens shutter mode for the exposing operations using LS 208. If shutter release button 207 of FIG. 7 is depressed for photography, sequence control means SC first designates second driving means D2 to output a signal so that opening blade 213 of FPS 211 is moved from one end P1 to the other end P2 of the frame to open photographing area 204.

Next, sequence control means SC designates first driving means D1 to output a signal so that LS 208 is opened or closed to expose film F in the light amount corresponding to the area Q1. At this time, LS 208 accomplishes the programed exposure by varying both the aperture diameter and shutter speed, depending upon the brightness of the object.

Subsequently, sequence control means SC designates second driving means D2 to output a signal so that closing blade 214 of FPS 211 is moved from the one end P1 to the other end P2 to close photographing area 204.

When FPS 211 ends its operation, sequence control means SC outputs a signal for winding up film F to a new frame number and energizes the motor (not shown) for charging FPS 211.

By the operations thus far described, the photography in the lens shutter mode is ended.

FIG. 5 is an operation diagram for the case where changeover means 215 is set in the focal-plane shutter mode for exposure by FPS 211.

Figure 7:
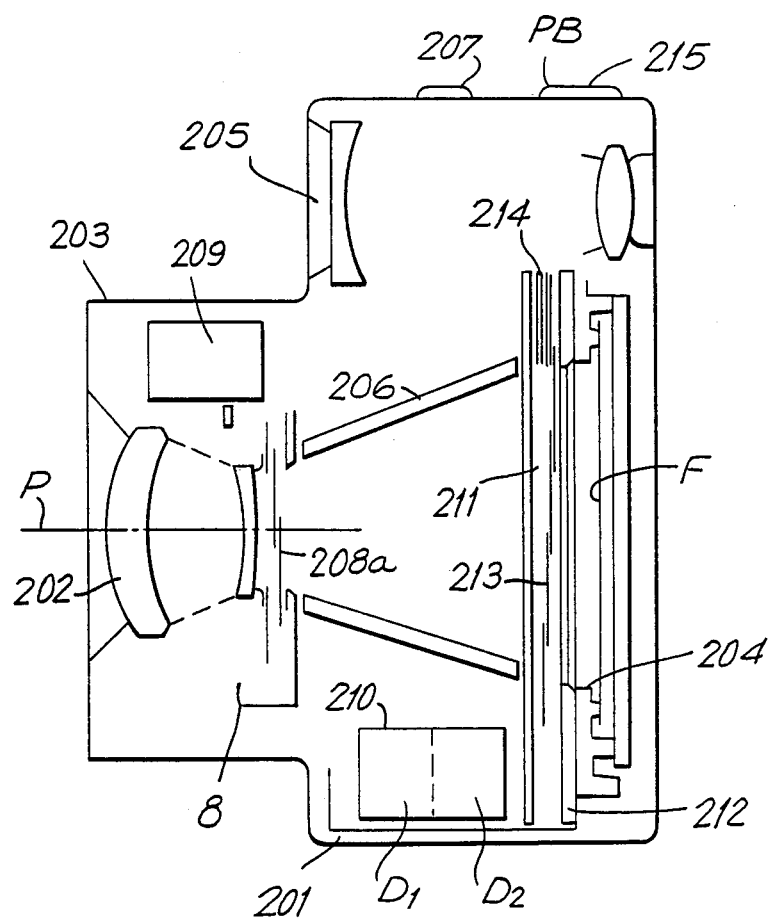
FIG. 7 is a schematic cross-sectional view showing a camera according to another embodiment of the present invention.

If shutter release button 207 of FIG. 7 is depressed for photography, sequence control means SC first designates first driving means D1 to output a signal so that LS 208 is opened to a predetermined aperture value d1 to open the lens aperture.

Next, sequence control means SC designates second driving means D2 to output a signal so that opening blade 213 and closing blade 214 of FPS 211 are sequentially operated to expose film F. At this time, opening and closing blades 213 and 214 operate at a time interval t giving a proper exposure value in combination with the aperture value d1 of LS 208, in dependence upon the brightness of the object.

Subsequently, sequence control means SC designates first driving means D1 to output a signal to thereby close LS 208.

At the end of the operation of LS 208, sequence control means SC outputs a signal to wind up film F to a new frame number and energizes the motor (not shown) to charge FPS 211.

Incidentally, in the operations within the so-called "strobe-synchronized limit speed range of the FPS," in which the exposure time by FPS 211 is relatively long, opening blade 213 is opened, as shown in FIG. 6, to turn on a strobe trigger switch at point X so that flash means 217 is caused to flash, with photographing area 4 being opened fully from position P1 to position P2.

By the operations thus far described, the photography in the focal-plane shutter mode is ended.

In the aforementioned embodiment, determining means 216 is enabled to function, in the case where the user sets a control unit disposed outside of the camera, to select flash photography, or in case of an automatic exposing operation using the flash means by mounting flash means 217 on the camera, by changing flash means 217 built into the camera into its operational state or by detecting the brightness of the object or the backlighted state automatically.

Although the foregoing embodiment has been exemplified by using a step motor, the present invention can be likewise embodied by an ultrasonic or DC motor if the motor can be turned back and forth.

Moreover, a single-lens reflex camera can be constructed on the basis of the concept of the present invention.

By providing determining means 216, as has been apparent from the description thus far made, the features of the two shutter can be effectively exploited in accordance with the photographic object. Specifically, the FPS mode is set for the flash photograph In case it is detected and determined that the operating speed of the FPS exceeds the limit value for synchronization with the flash, the mode is automatically and coercively changed to the LS mode. Moreover, this LS mode is indicated by the indicating means. For the correct photography synchronized with the flash light, sequence control means SC operates the LS and the FPS at a proper timing.

If the focal-plane shutter mode is set with an intention to enlarge the aperture value so as to reduce the focal depth of the object for portrait photography, the main object may be backlighted depending upon its brightness, and the FPS may fail to synchronize, if the flash means flashes, to cause so-called "uneven exposure." Even in this case, according to the present invention, the mode is automatically changed to the lens shutter mode suited for flash photography so that the correct photography can be accomplished. In this case, however, either a programed shutter for causing the flash means to flash, when the aperture reaches the value corresponding to the distance to the main object, is used so that the exposure may be accomplished with the brightness of natural surrounding light, or a shutter which is equipped with means for shortening the exposure time by turning the motor at a high speed while stressing the aperture value is used.

Having described a specific preferred embodiment of the invention with reference to the accompanying drawings, it will be appreciated that the present invention is not limited to those precise embodiments, and that various changes and modifications can be effected therein by one of ordinary skill in the art without departing from the spirit or scope of the invention, as defined by the appended claims.

What is claimed is:

1. In a camera having a lens shutter for performing a programmed exposure and aperture control, and a focal-plane shutter, a flash photography changeover device comprising:
   (a) first changeover means for selecting one of the following modes of operation:
      (i) a lens shutter mode in which the lens shutter is operated as a programmed shutter, and
      (ii) a focal-plane shutter mode in which the shutter speed is controlled by the focal-plane shutter and the aperture is controlled by the lens shutter;
   (b) first driving means for controlling at least one of the following:
      (i) a programmed exposure value of the lens shutter, and
      (ii) the size of said aperture of said lens shutter;
   (c) second driving means for controlling the shutter speed of the focal-plane shutter; and
   (d) sequence control means for controlling operation timings of said first and second driving means;
   (e) setting means for selecting and setting automatic exposures with ambient light and a flash light; and
   (f) coercive changeover means for setting said lens shutter mode irrespective of the setting of said first changeover means when said setting means is set to automatic exposure with the flash light.

2. A flash photography changeover device according to claim 1, wherein said coercive changeover means and said setting means are each connected with said first changeover means.

3. A flash photography changeover device according to claim 2, wherein said coercive changeover means is further connected with said sequence control means for applying an output control signal thereto.

4. A flash photography changeover device according to claim 1, wherein said camera further includes an object lens and operation means for producing at least one output signal in response to means for measuring the brightness of an object to be photographed, means for measuring the distance of the camera from the object, means for setting the focal length of the object lens and means for setting a film speed of the camera; and said coercive changeover means includes an input supplied with one said output signal from said operation means.

5. A flash photography changeover device according to claim 4, wherein said operation means further supplies an output signal to said sequence control means.

6. In a camera having a lens shutter for performing a programmed exposure and aperture control, and a focal-plane shutter, a flash photography changeover device comprising:
   (a) first changeover means for selecting one of the following modes of operation:
      (i) a lens shutter mode in which the lens shutter is operated as a programmed shutter, and
      (ii) a focal-plane shutter mode in which the shutter speed is controlled by the focal-plane shutter and the aperture is controlled by the lens shutter;
   (b) first driving means for controlling at least one of the following:
      (i) a programmed exposure value of the lens shutter, and
      (ii) the size of said aperture of said lens shutter;
   (c) second driving means for controlling the shutter speed of the focal-plane shutter; and
   (d) sequence control means for controlling operation timings of said first and second driving means;
   (e) determining means for detecting and determining a limit shutter speed at which said focal-plane shutter is synchronized with a flash light; and
   (f) coercive changeover means for setting said lens shutter mode irrespective of the setting of said first changeover means when said determining means determines that the shutter speed of said focal-plane shutter exceeds said limit shutter speed synchronized with the flash light.

7. A flash photography changeover device according to claim 6, wherein said coercive changeover means is connected with said first changeover means and said determining means has an output connected with an input of said coercive changeover means.

8. A flash photography changeover device according to claim 7, wherein said coercive changeover means is further connected with said sequence control means for supplying an output control signal thereto.

9. A flash photography changeover device according to claim 8, wherein said determining means includes an input connected with an output of said sequence control means.

10. A flash photography changeover device according to claim 6, wherein said operation means further supplies an output signal to said sequence control means.

* * * * *